United States Patent [19]

Sigel

[11] Patent Number: 5,423,352

[45] Date of Patent: Jun. 13, 1995

[54] REMOTE-CONTROLLED INSERTION OF SHEATHING IN INACCESSIBLE MANIFOLDS AND JUNCTIONS

[75] Inventor: Alwin Sigel, Schlatt, Switzerland

[73] Assignee: Sika Robotics AG, Gruningen, Switzerland

[21] Appl. No.: 159,245

[22] Filed: Nov. 30, 1993

Related U.S. Application Data

[62] Division of Ser. No. 58,799, May 10, 1993, Pat. No. 5,285,817.

[30] Foreign Application Priority Data

Jan. 12, 1989 [CH]  Switzerland ............... 04312/89

[51] Int. Cl.⁶ ............................................. F16L 55/16
[52] U.S. Cl. ...................................... 138/98; 138/93
[58] Field of Search ................... 138/98, 97, 93; 264/270, 36; 405/150.1, 154

[56] References Cited

U.S. PATENT DOCUMENTS

| | | | |
|---|---|---|---|
| 1,514,062 | 11/1924 | McLain . | |
| 2,393,587 | 1/1946 | Bugg et al. . | |
| 2,811,985 | 11/1957 | Wells | 138/93 |
| 4,069,573 | 1/1978 | Rogers, Jr. et al. . | |
| 4,197,908 | 4/1980 | Davis et al. . | |
| 4,245,970 | 1/1981 | St. Onge | 264/36 |
| 4,347,018 | 8/1982 | Wrightson et al. | 138/97 |
| 4,434,115 | 2/1984 | Chick | 264/36 |
| 4,442,891 | 4/1984 | Wood . | |
| 4,577,388 | 3/1986 | Wood . | |
| 4,591,477 | 5/1986 | Rettew | 138/93 |
| 4,601,312 | 7/1986 | Parkyn, Sr. | 138/98 |
| 4,630,676 | 12/1986 | Long, Jr. . | |
| 4,643,855 | 2/1987 | Parkes et al. | 138/97 |
| 4,646,787 | 3/1987 | Rush et al. | 138/93 |
| 4,648,454 | 3/1987 | Yarnell . | |
| 4,657,450 | 4/1987 | Förner et al. . | |
| 4,701,988 | 10/1987 | Wood . | |
| 4,719,687 | 1/1988 | Nanny | 138/93 |
| 4,723,579 | 2/1988 | Hyodo et al. | 138/98 |
| 4,728,223 | 3/1988 | Rice | 405/154 |
| 4,848,406 | 7/1989 | Stauner et al. | 138/93 |
| 4,890,483 | 1/1990 | Vetter | 138/93 |
| 4,956,041 | 9/1990 | Miyazaki et al. | 156/287 |
| 4,995,761 | 2/1991 | Barton | 138/97 |
| 5,034,180 | 7/1991 | Steketee, Jr. | 156/287 |
| 5,042,532 | 8/1991 | Gilleland | 138/98 |
| 5,066,208 | 11/1991 | Warmerdam | 138/98 |
| 5,108,228 | 4/1992 | Miyazaki et al. | 405/154 |
| 5,167,258 | 12/1992 | Rice | 405/154 |

FOREIGN PATENT DOCUMENTS

| | | | |
|---|---|---|---|
| 0024157 | 8/1980 | European Pat. Off. . | |
| 0159300 | 10/1985 | European Pat. Off. . | |
| 2728056 | 1/1979 | Germany | 138/98 |
| 3119360 | 12/1982 | Germany | 138/98 |
| 3504935 | 10/1985 | Germany . | |
| 3446055 | 6/1986 | Germany . | |
| 0106923 | 8/1979 | Japan | 138/98 |
| 2102024 | 4/1990 | Japan . | |
| 3117798 | 5/1991 | Japan | 138/98 |
| 7618806 | 10/1980 | Switzerland . | |
| 2147682 | 8/1984 | United Kingdom . | |
| 698726 | 12/1979 | U.S.S.R. . | |
| 854610 | 8/1981 | U.S.S.R. . | |
| 8604975 | 8/1986 | WIPO . | |
| 8908218 | 2/1989 | WIPO . | |
| 9005874 | 11/1989 | WIPO . | |

*Primary Examiner*—David A. Scherbel
*Assistant Examiner*—James Hook
*Attorney, Agent, or Firm*—Evenson, McKeown, Edwards & Lenahan

[57] ABSTRACT

The new, remote-controlled installation of sheathing into inaccessible manifolds and junctions from subsidiary into main piping makes it possible to repair damaged intersections cheaply, rapidly and reliably, without the intersection having to be exposed by excavation. An application device (1), which is installed on a pipe-repairing machine, makes insertion of a lost sheathing (4) into the subsidiary piping (8) possible. The cavity (12) which comes about in this way between the sheathing (4) and the damaged part is subsequently sprayed with specially suited sealing mass by means of a high-pressure nozzle (13).

11 Claims, 6 Drawing Sheets

REMOTE-CONTROLLED INSERTION OF SHEATHING IN INACCESSIBLE MANIFOLDS AND JUNCTIONS

This application is a division of Ser. No. 08/058,799 filed May 10, 1993, now U.S. Pat. No. 5,285,817.

In manifolds and junctions, for example in main and subsidiary piping, damage of the intersection frequently comes about, especially in water-pipes. This is mainly caused by corrosive or erosive components in the sewage water. The intersections damaged in this way represent a great risk for the ground water and thus for the drinking water of entire regions, because in this way uncontrolled, large amounts of dangerous sewage water can seep into the ground. For this reason, fissures or damage which have been established in manifolds or junctions are to be repaired as soon as possible.

Repairs to manifolds and junctions cannot be carried out with simple means, above all when the pipes have such small diameters that they are inaccessible. Up to now, there was no other option but to expose the damaged spot through excavation and to replace the pipe elements which had been damaged. There is the possibility of spraying the damaged areas with a special sealing gel, but this gel tends to become brittle and thus porous due to the formation of hairline cracks as soon as the ground water level drops, for example due to the time of year; this solution is therefore not to be recommended.

The new remote-controlled installation of sheathing in inaccessible manifolds and junctions has been derived from a similar method of repair for pipes which has already been patented by the same inventor (Swiss patent application number 3808/87-7) and has already been used successfully. For this patent, a remote-controlled pipe-repairing machine is also used advantageously, which has also been patented by the same inventor and has daily proven its worth in hard use (Swiss patent application no. 1222/87-0).

The remote-controlled installation of sheathing for manifolds and junctions is the logical further development of this invention. The following are shown:

FIG. 2b is a partially cut away cross-sectional view showing the application device inserted into the branch piping of FIG. 2a;

Figure 1A:
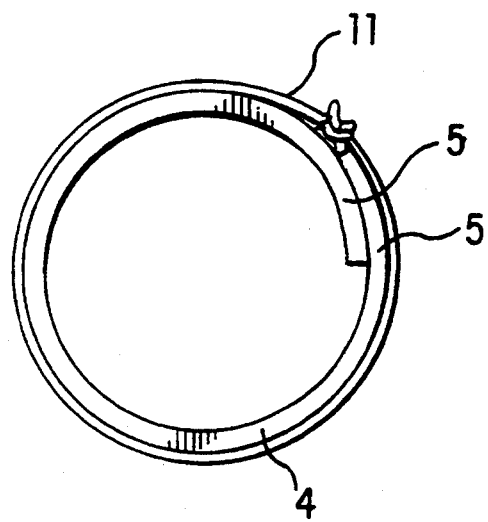
FIG. 1a is an end elevational view of a sheathing to be installed in accordance with the present invention.
Figure 1B:
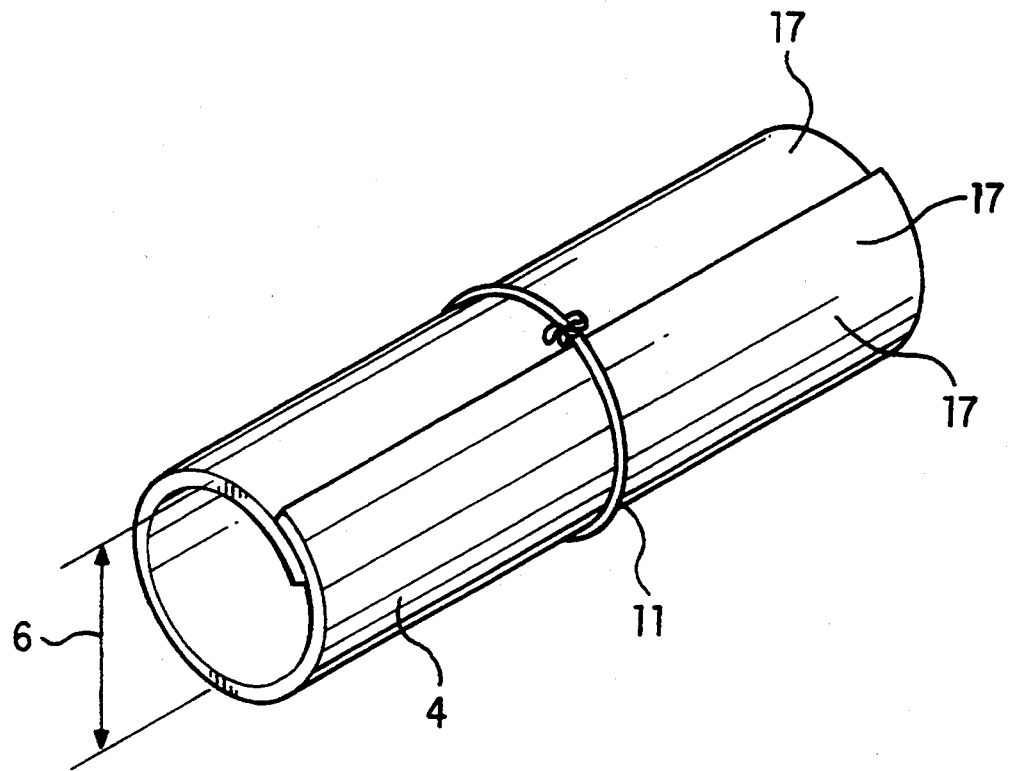
FIG. 1b is a perspective view showing the sheathing of FIG. 1.
Figure 2A:
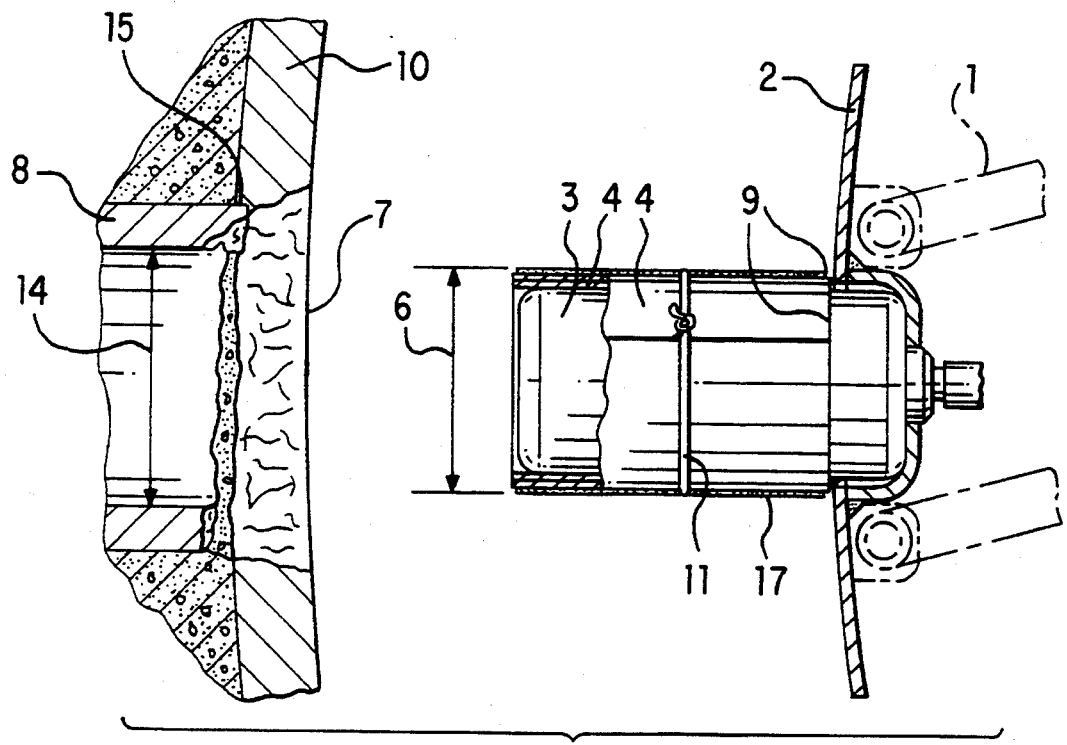
FIG. 2a is a partially cut away cross-sectional view showing an application device in accordance with the present invention approaching the junction of a subsidiary or branch piping and the main piping.
Figure 2B:
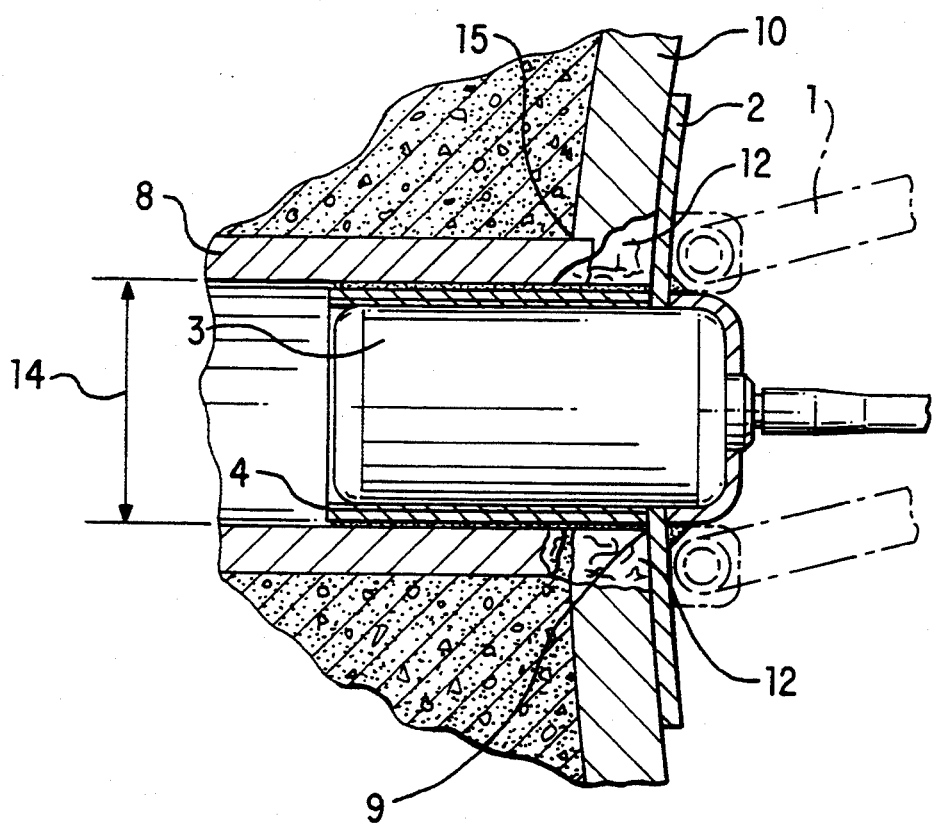

The application device 1 (FIG. 2) consists principally of a bent screen 2 and a pipe-shaped, so-called balloon 3, which protrudes from the latter and essentially corresponds to an inflatable rubber hose. The sheathing 4 (FIG. 1) is now slipped over the balloon 3. This sheathing has a longitudinal slit and is compressed in such a way that the walls 5 overlap. Thus, a diameter 6 can be achieved which is smaller than the internal diameter 14 of the junction 7 of the subsidiary piping 8 (or of the manifold, which is not shown). Thus it is possible to insert the sheathing 4 into the subsidiary piping 8 thanks to the expandable balloon 3, as is shown in FIG. 2. FIG. 2a shows the application device 1 with the retracted balloon during the approach to the damaged spot through the inaccessible main piping 10, which, as already mentioned, is carried out by means of a repair machine, and FIG. 2b shows the application device 1 with the balloon 3 which has been inserted into the subsidiary pipe 8. From FIG. 2, it can also be seen that the sheathing 4 is pushed into the subsidiary piping 8 until the edge 9 makes flush contact with the screen 2 pushed onto the main piping 10. Thus, it is guaranteed that on the one hand the sheathing is not pushed too far into the subsidiary piping 8 and that on the other hand it does not protrude into the main piping 10 after the repair work has been carried out, thus reducing its serviceable diameter. Exact positioning understandably makes clean, qualitatively faultless repair of the damaged intersection 15 possible.

Figure 5:
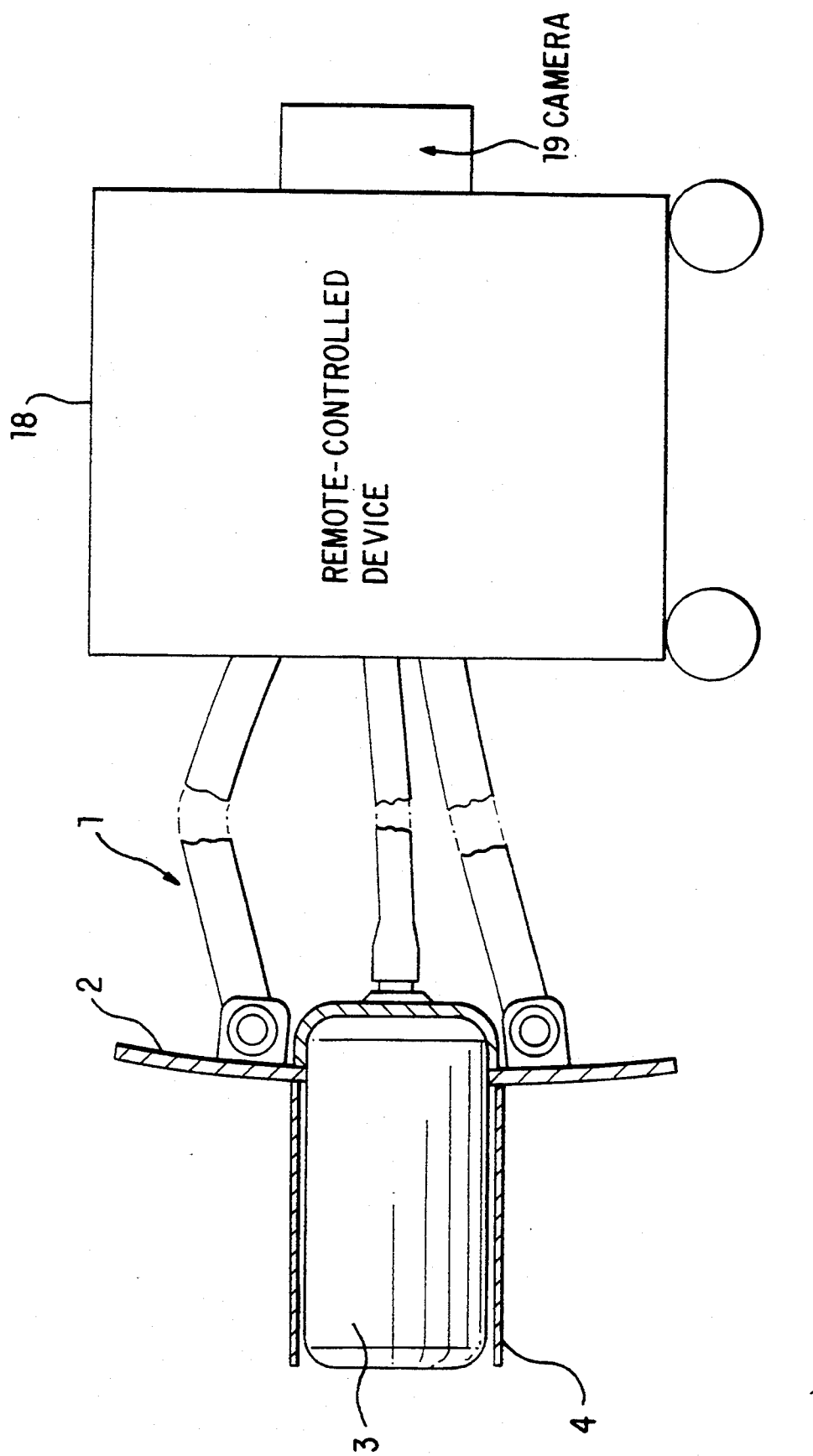
FIG. 5 is a block diagram of a conventional pipe-repairing machine.
Figure 6:
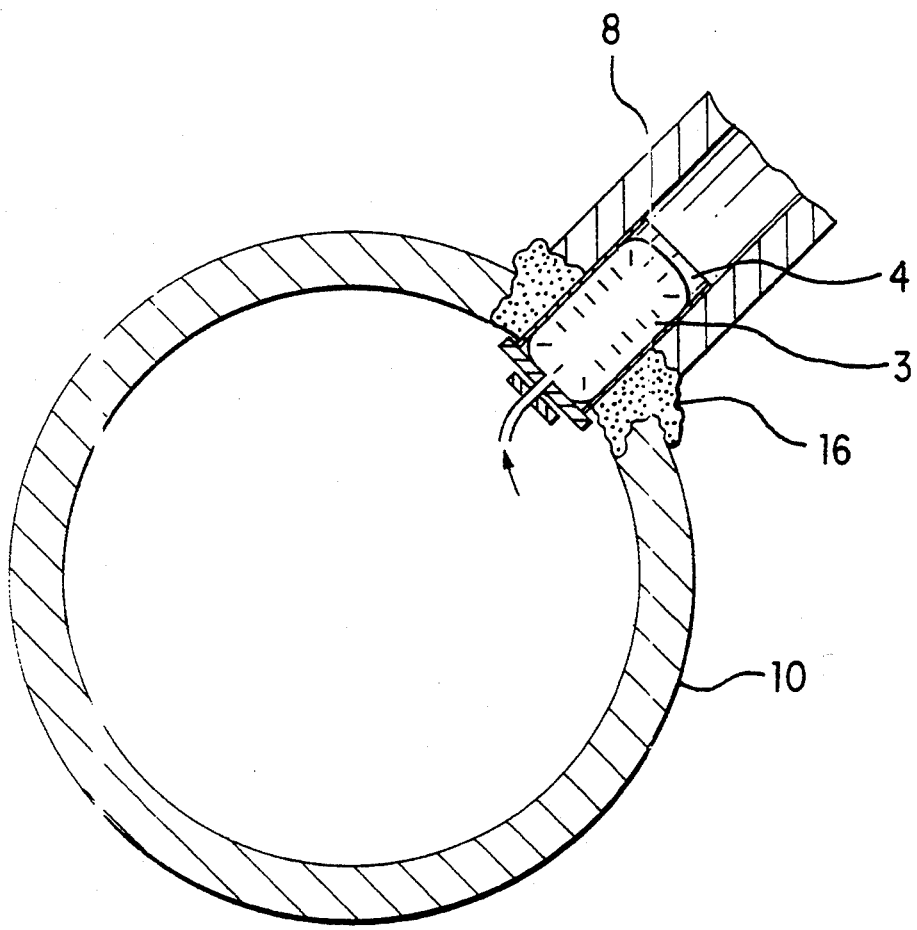
FIG. 6 is a cross-sectional view corresponding to FIG. 2b showing the cross-section of the main piping in its entirety.

Incidentally, the application device 1 is a replaceable component of a remote-controlled device such as the pipe-repairing machine 18 shown in FIG. 5 which, as already mentioned, has already been patented by the same inventor. Thus, it is possible without difficulty to feed in the compressed air to pump up the balloon 3 and to observe and control the insertion of the sheathing from the outside by means of a video camera fitted on the pipe-repairing machine.

Figure 3:
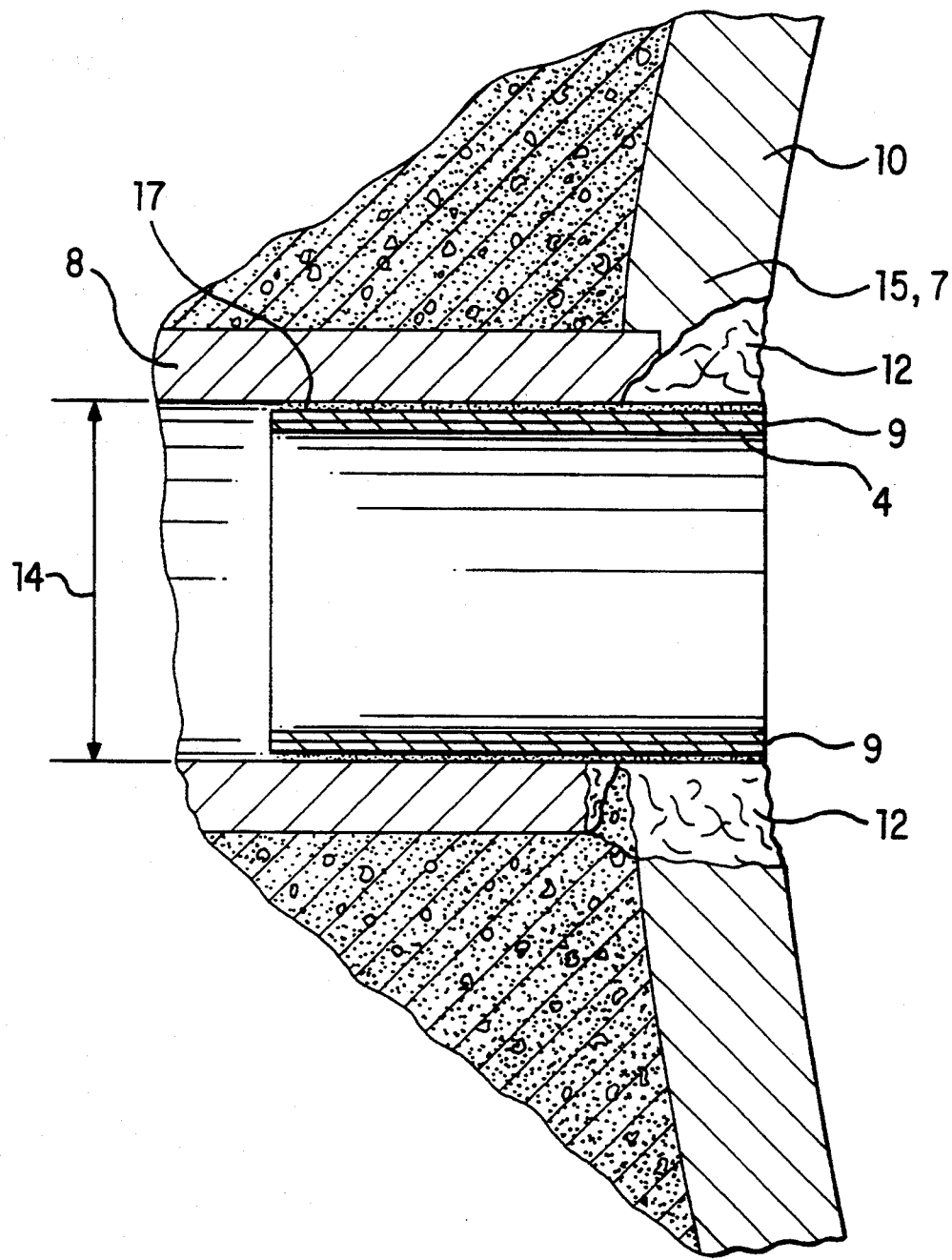
FIG. 3 is a partially cut away cross-sectional view of the junction with the application device removed.

When the sheathing 4 is placed in its exact position, the balloon 3 is pumped up with compressed air. The pressure which consequently acts on the sheathing causes a wire 11 (or more than one wire 11) to tear; this wire/these wires had previously held the slit sheathing at the diameter 6. The sheathing, which has been pretensed in this way, then suddenly expands and presses itself against the internal walls of the subsidiary piping 8, which had been undamaged up to then. The expansion of the sheathing and its pressing against the internal walls of the subsidiary piping 8 are supported by the pressure in the balloon 3, which continues to rise somewhat at the same time. The sheathing 4 is now held in this position, because it has been coated all around its circumference with adhesive 17 (e.g. epoxy resin or another suitable two-component adhesive) before entry into the piping. The adhesion points are freed from bacteria and unhealthy material by cleaning and mechanical surface treatment. In order to avoid a drying of the adhesion points, work is mainly done with wet adhesive glues. After the sheathing has been applied and put into position, the compressed air can be removed from the balloon 3; the application device is removed from the sheathing. The first phase of the repair has been completed. (FIG. 3)

Figure 4:
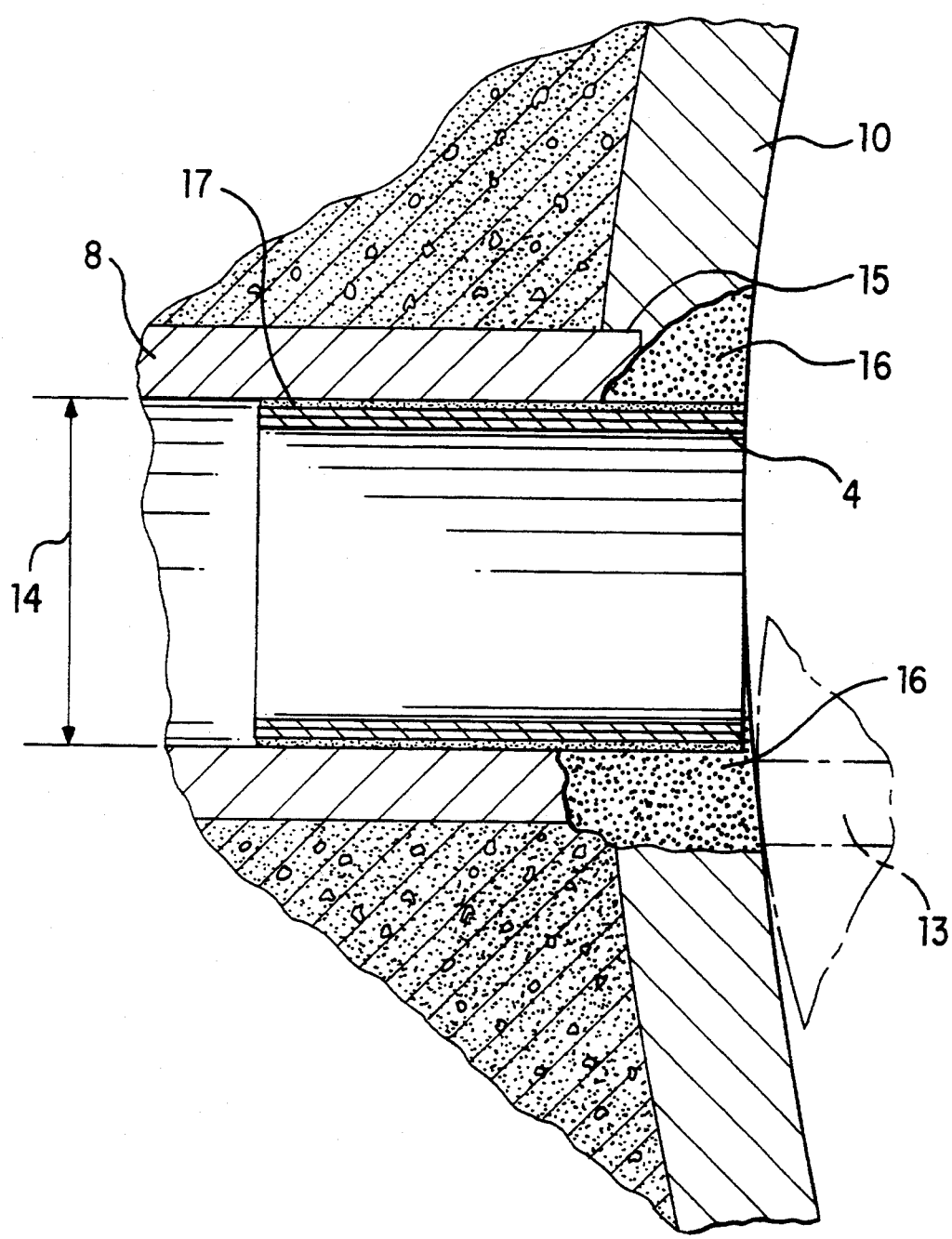
FIG. 4 is a partially cut away cross-sectional view of the junction with a sealing mass injected into the damaged portion of the piping.

The second phase of the repair (FIG. 4) consists of the cavity 12 between the sheathing 4 and the damaged intersection 15 being sprayed with sealing mass 16. In this, a high-pressure nozzle 13 is used (FIG. 4), which is either integrated into the application device 1 or fitted to the pipe-repairing machine already mentioned as a component part. When the damaged spot has been sealed all around, only routine subsequent work must be carried out with the pipe-repairing machine (grinding etc.). The sheathing 4 is left there as a lost sheathing. It can be produced of non-rotting and chemically resistant material. This includes stainless steels or plastics which are especially suited for sewer pipes. The use of rottable material is however to be considered: as the sheathing has fulfilled its purpose following the repair work and the sealing mass has hardened, no damage is caused if, for example, nothing can be seen of it one year after the repair. The biologically decomposable plastics, which are still in the development phase, are representatives of these rottable plastics, but there are certainly other suitable materials.

Incidentally, the sheathing 4 can have various lengths, depending upon requirements, and can be produced from tubes with a longitudinal slit or from pre-bent panels. Attention must merely be paid to the fact that the spring constant of the material is large enough for the sheathing 4 to expand well after the wire 11 has torn.

The new remote-controlled sheathing installation for inaccessible manifolds and junctions makes cheap and simultaneously efficient repair work on damaged intersections possible, as the latter do not need to be exposed by excavation. Reliability is thus guaranteed by tested pipe-repairing machines with their (replaceable) components and newly developed sealing masses being used.

For the sake of completeness, it must be mentioned that the sheathing installation described can also be carried out manually, should the damaged spot be in an accessible pipe.

I claim:

1. A method for the remote-controlled repair of a damaged part of a manifold of junctions on a main piping comprising:
    (A) providing an application device comprising:
        (1) a positioning means for positioning said application device on an internal wall of the main piping;
        (2) an inflatable balloon extendable from said positioning means in the direction of the internal wall of the main piping;
        (3) an air compressor connectable to said balloon; and
        (4) an expandable sheathing, said sheathing being rolled into a pre-tensioned state around said balloon and held by at least one wire therearound;
    (B) inserting said application device into the main piping;
    (C) inserting said balloon, together with said expandable sheathing placed over said balloon and held tightly therearound by said at least one wire, into a junction of a branch piping of the manifold;
    (D) inflating said balloon to thereby cause said at least one wire to break so that said sheathing is released and thereby pressed against an interior wall of the branch piping as it springs open from its pre-tensioned state.

2. A method according to claim 1 wherein the expandable sheating is a pipe which is longitudinally slit through to thereby form wall portions which about at the slit, said pipe being compressed and pre-stressed in such a way that the wall portions overlap.

3. Method according to claim 2, wherein the longitudinally slit pipe is compressed to a diameter which is smaller than an internal diameter of the branch piping and is prestressed in this way.

4. Method according to claim 3, wherein the pipe is compressed by said wire, which is torn under the pressure of the expansion as a result of the inflation of the balloon.

5. A method according to claim 1, wherein there is a cavity between the sheathing and the damaged part, said method further comprising filling said cavity with a sealing mass.

6. A method according to claim 1, wherein said positioning means is a screen.

7. Method according to claim 6, wherein the ballon with the sheathing is inserted into the branch piping to such a distance that the screen makes contact with the internal wall of the main piping.

8. Method according to one of the claims 1 to 4, 6, or 7 wherein an adhesive agent is applied to the outside of the sheathing before the latter is inserted into the branch piping.

9. A method according to claim 5, wherein said inserting and filling steps are controlled by a remote-control device.

10. Method according to claim 9, wherein the remote control device is steered by a video camera supervising the processes at the manifold.

11. Method according to claim 1, wherein the application device is inserted into the main piping of a sewer pipe.

* * * * *